US 11,947,959 B2

(12) United States Patent
Golov

(10) Patent No.: US 11,947,959 B2
(45) Date of Patent: Apr. 2, 2024

(54) RE-USING PROCESSING ELEMENTS OF AN ARTIFICIAL INTELLIGENCE PROCESSOR

(71) Applicant: Micron Technology, Inc., Boise, ID (US)

(72) Inventor: Gil Golov, Backnang (DE)

(73) Assignee: Micron Technology, Inc., Boise, ID (US)

( * ) Notice: Subject to any disclaimer, the term of this patent is extended or adjusted under 35 U.S.C. 154(b) by 580 days.

(21) Appl. No.: 16/566,370

(22) Filed: Sep. 10, 2019

(65) Prior Publication Data

US 2021/0072984 A1    Mar. 11, 2021

(51) Int. Cl.
*G06F 9/30*     (2018.01)
*G06N 3/063*    (2023.01)

(52) U.S. Cl.
CPC ........ *G06F 9/3001* (2013.01); *G06F 9/30036* (2013.01); *G06N 3/063* (2013.01)

(58) Field of Classification Search
None
See application file for complete search history.

(56) References Cited

U.S. PATENT DOCUMENTS

| 5,220,206 A * | 6/1993 | Tsang .................... H03L 7/0896 327/91 |
| 6,223,196 B1 | 4/2001 | Hattori et al. |
| 6,367,003 B1 * | 4/2002 | Davis .................... G06F 9/3001 712/216 |
| 9,176,709 B2 | 11/2015 | Sugisawa |
| 2004/0088472 A1 * | 5/2004 | Nystuen .............. G06F 13/1647 711/154 |
| 2015/0029233 A1 * | 1/2015 | Bae ........................ G09G 5/363 345/211 |
| 2020/0184001 A1 * | 6/2020 | Gu ....................... G06F 15/8046 |

OTHER PUBLICATIONS

Extended European Search Report, EP20195072.2, dated Jan. 22, 2021.

* cited by examiner

*Primary Examiner* — John M Lindlof
(74) *Attorney, Agent, or Firm* — Greenberg Traurig

(57) ABSTRACT

The disclosed embodiments are directed toward improved control circuitry for artificial intelligence processors. In one embodiment, a device is disclosed comprising a processing element, the processing element including a processing device configured to receive a first set of vectors; a hijack control circuit, the hijack control circuit configured to replace the first set of vectors with a second set of vectors in response to detecting that the processing element is idle; and a processing element control circuit (PECC), the PECC storing a set of values representing the second set of vectors, the set of values retrieved from a remote data source.

19 Claims, 5 Drawing Sheets

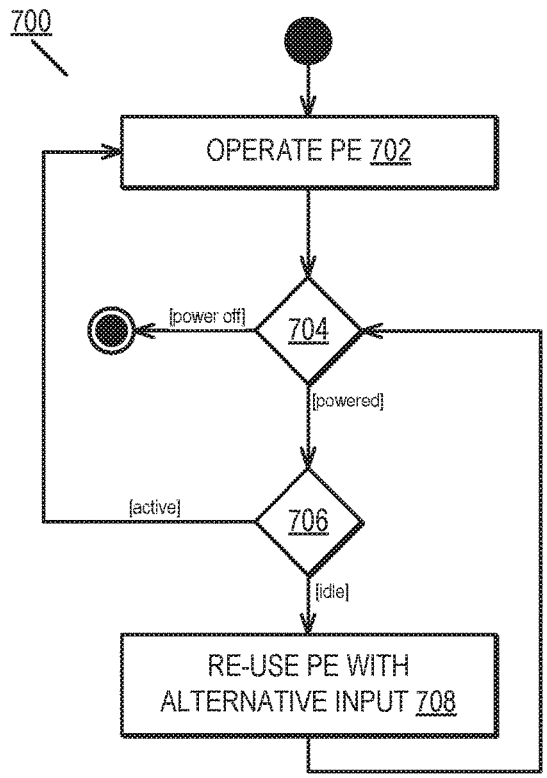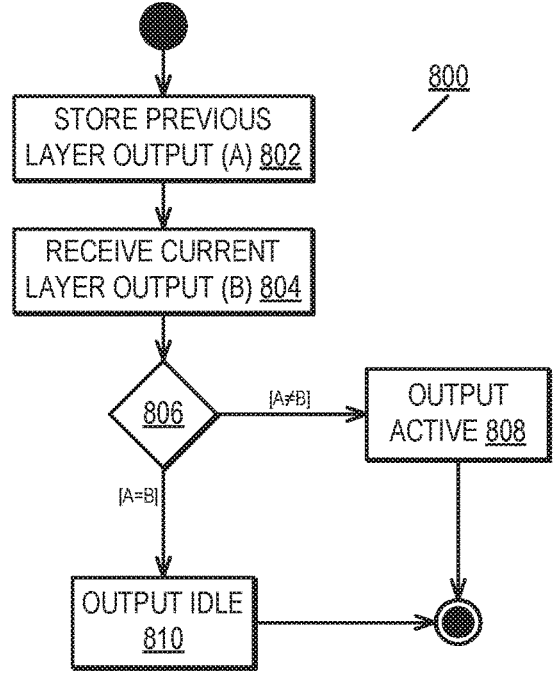
FIG. 7  FIG. 8
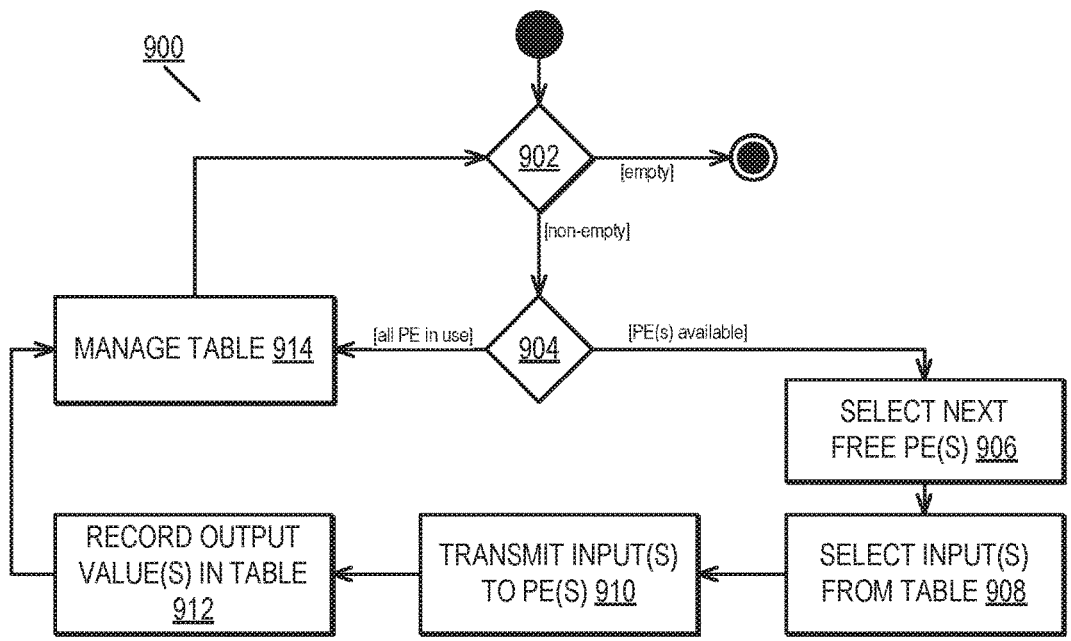
FIG. 9

RE-USING PROCESSING ELEMENTS OF AN ARTIFICIAL INTELLIGENCE PROCESSOR

COPYRIGHT NOTICE

This application includes material that is subject to copyright protection. The copyright owner has no objection to the facsimile reproduction by anyone of the patent disclosure, as it appears in the Patent and Trademark Office files or records, but otherwise reserves all copyright rights whatsoever.

BACKGROUND

The disclosed embodiments are directed to artificial intelligence (AI) processors and specifically to improving performance of such processors by re-utilizing inactive multiply and accumulate (MAC) units.

With increased applications of AI and machine learning (ML), application-specific AI processors have been developed to increase the processing speed of AI algorithms such as neural network (NN) algorithms. Generally, such processors incorporate a large array of identical processing elements such as MAC units. In NN algorithms, these MAC units are either active (processing) or inactive (idle) based on the processing output of a previous MAC unit. This is due to the multi-layered nature of neural networks. Since one or more MAC units in an AI processor are idle due to the lack of a previous MAC unit activation, multiple computational units of an AI processor are wasted for any given clock cycle. This inactivity results in reduced throughput and increased power consumption for a finite task.

SUMMARY

The disclosed embodiments solve these and other technical problems by providing a mechanism to re-utilize idle processing elements such as MAC units. In the illustrated embodiments, a hijack control circuit is introduced into an AI processor that selectively toggles the inputs of a given MAC unit. This hijack control circuit analyzes the outputs of a given neural network layer over two clock cycles. If the output has not changed, the hijack control circuit switches the inputs of the MAC unit to an alternative input vector.

This alternative input vector is managed by a processing element control circuit. The processing element control circuit manages a table of input vectors received, in some embodiments, from a cloud platform. Upon receiving an indication that the inputs of MAC units should be toggled, the processing element control circuit selects and provides a fresh set of input vectors to the MAC units for processing.

In one embodiment, a device is disclosed comprising a processing element, the processing element including a processing device configured to receive a first set of vectors; a hijack control circuit, the hijack control circuit configured to replace the first set of vectors with a second set of vectors in response to detecting that the processing element is idle; and a processing element control circuit (PECC), the PECC storing a set of values representing the second set of vectors, the set of values retrieved from a remote data source.

In another embodiment, a method comprising: receiving, at a processing element including a processing device, a first set of vectors; storing, by a processing element control circuit (PECC), a set of values representing a second set of vectors, the set of values retrieved from a remote data source; and replacing, by a hijack control circuit, the first set of vectors with a second set of vectors in response to detecting that the processing element is idle.

BRIEF DESCRIPTION OF THE DRAWINGS

The foregoing and other objects, features, and advantages of the disclosure will be apparent from the following description of embodiments as illustrated in the accompanying drawings, in which reference characters refer to the same parts throughout the various views. The drawings are not necessarily to scale, emphasis instead being placed upon illustrating principles of the disclosure.

FIG. 7 is a flow diagram illustrating a method for re-using a processing element in an AI processor according to some embodiments of the disclosure.

FIG. 8 is a flow diagram illustrating a method for detecting that processing element is idle according to some embodiments of the disclosure.

FIG. 9 is a flow diagram illustrating a method for managing a table of input vectors according to some embodiments of the disclosure.

DETAILED DESCRIPTION

Figure 1:
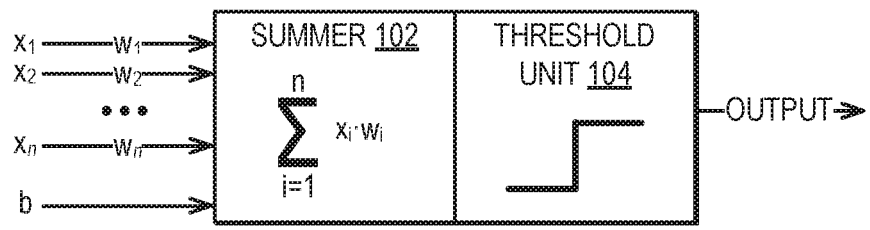
FIG. 1 is a block diagram illustrating an artificial neuron according to some embodiments of the disclosure.

FIG. 1 is a block diagram illustrating an artificial neuron according to some embodiments of the disclosure.

Figure 2:
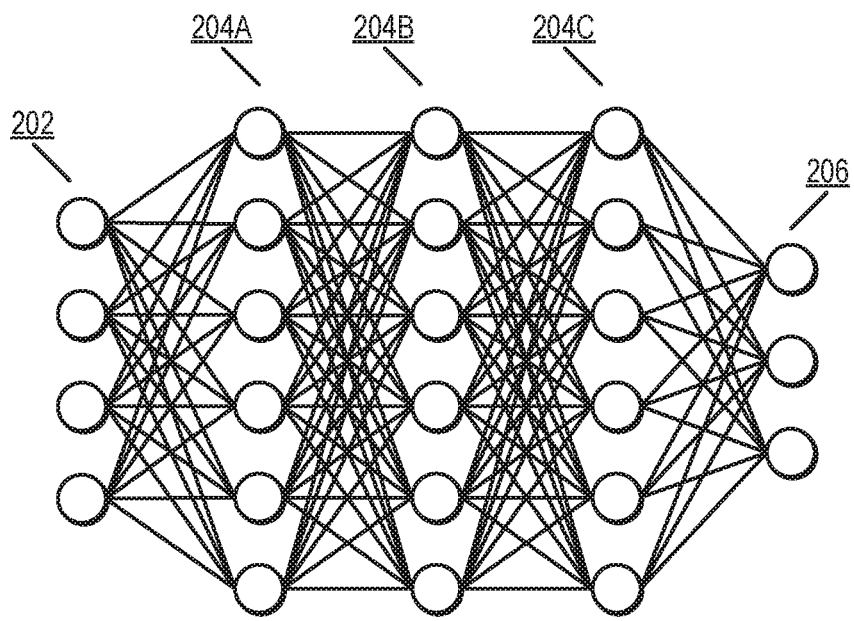
FIG. 2 is a block diagram of a neural network according to some embodiments of the disclosure.

In the illustrated embodiment, the artificial neuron comprises a digital processing element that simulates the behavior of a biological neuron in the human brain. Multiple of similar neurons are used to make up an artificial neural network as illustrated in FIG. 2. In some embodiments, the neuron comprises a software construct; however, in the illustrated embodiment, the artificial neuron comprises a hardware processing element.

The illustrated artificial neuron comprises a processing element for processing an input vector x, the vector x comprising values $x_1, x_2, \ldots, x_n$. Each of the values of x is associated with a corresponding weight $w_1, w_2, \ldots w_n$ (constituting a weight vector w). Thus, the input to the artificial neuron comprises a weighted input. In some embodiments, the artificial neuron is further configured to receive a bias input b. In some embodiments, this bias input is hardcoded to a logical high value (i.e., a 1 value). In some embodiments, the bias value is selected to provide a default output value of the neuron when all inputs are logical low (i.e., zero).

As illustrated, the artificial neuron includes a two-stage processing pipeline. During the first stage, a summer (102) is used to sum the products of the values of input vector x and weight vector w. In some embodiments, the summation is added with the bias input b (if implemented). The resulting value thus constitutes a scalar value that is provided by the summer (102) to the threshold unit (104).

As illustrated, the threshold unit (104) receives the scalar output of summer (102) and generates an output value. In general, the threshold unit (104) compares the output to a threshold and if the value exceeds the threshold, outputs a first constant value (i.e., 1) and if the value is below the threshold outputs a second constant value (i.e., 0). In some embodiments, the threshold unit (104) utilizes a linear function, sigmoid function, tan h function, ReLu function or other type of function. In some embodiments, the threshold unit (104) may also be referred to as an activation unit or activation function.

FIG. 2 is a block diagram of a neural network according to some embodiments of the disclosure.

As illustrated, a neural network includes a plurality of artificial neurons (illustrated in FIG. 1) that are connected in multiple layers. In the illustrated embodiment, a three-layer neural network is illustrated. The network includes an input layer (202) and output layer (206). Input and output layers generally do not comprise artificial neurons but rather handle the input and output of vectors, respectively.

In contrast, the network includes three "hidden" layers (204a, 204b, 204c) that each include six artificial neurons. Each neuron receives the output of each processing element in the earlier layer. These layers are referred to as hidden layers as they are generally not accessible by other processing elements (or users). The illustrated network depicts three hidden layers having six neurons each, however any number of hidden layers and any number of neurons per-layer may be used.

In the illustrated embodiment, an input vector is provided to the hidden layers (204a, 204b, 204c) via the input layer (202). Each value of the input vector is provided to each neuron of the first hidden layer (204a) which computes an interim vector, this interim vector is transmitted to the second layer (204b) which performs a similar operation and issues a second interim vector to the final hidden layer (204c). The final hidden layer (204c) processes the second interim vector and generates an output vector which is transmitted to the output layer (206). In the illustrated embodiment, the neural network is trained to adjust the value of the weights used in each layer. Further details on neural networks are not provided herein and any existing or future neural networks employing a similar structure may also be used.

Figure 3:
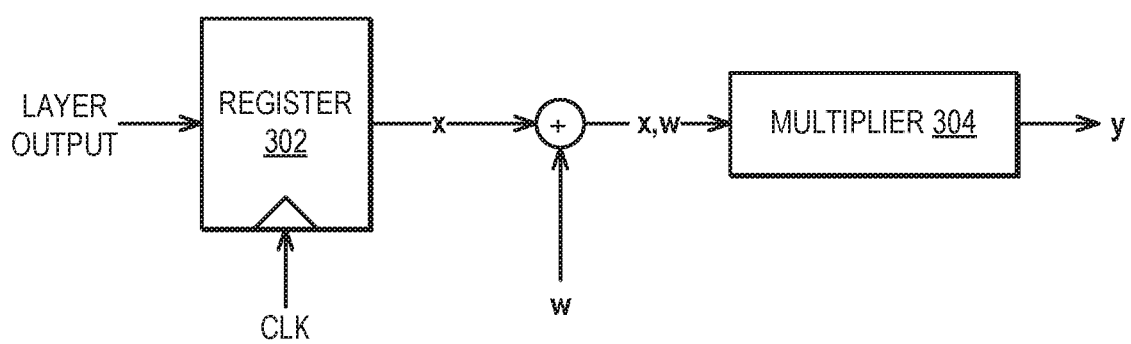
FIG. 3 is a block diagram of a multiplier unit according to one embodiment of the disclosure.

FIG. 3 is a block diagram of a multiplier unit according to one embodiment of the disclosure.

In the illustrated embodiment, a layer output (either from a hidden layer or input layer) is received by the multiplier unit via register (302) which is driven by a system clock. The register (302) stores the layer output for a predetermined number of clock cycles. As illustrated, the layer output (x) is then combined with a weight vector (w) associated with the given layer implemented by the multiplier unit. The two vectors (x, w) are then provided to the multiplier (304).

In response, the multiplier (304) performs and multiplies the input vectors. In the illustrated embodiment, this multiplication comprises multiplying each value of the input vector with a corresponding weight value. Thus, if $x = \{x_1, x_2, \ldots x_n\}$ and $w = \{w_1, w_2, \ldots w_n\}$, the resulting output vector y comprises $y = \{x_1 w_1, x_2 w_2, \ldots x_n w_n\}$.

In some embodiments, the multiplier (304) can comprise a Booth multiplier, however other multipliers may be used. In some embodiments, the multiplier (304) includes multiple individual multipliers to multiple each value of the input vector x with the weight vector w. Thus, the input and weight vectors (x, w) were 64-bit vectors, the multiplier (304) may include 64 individual multipliers. As described above, but not illustrated, the multiplied values are then accumulated (or added) to generate an output value for further processing by subsequent layers.

Figure 4:
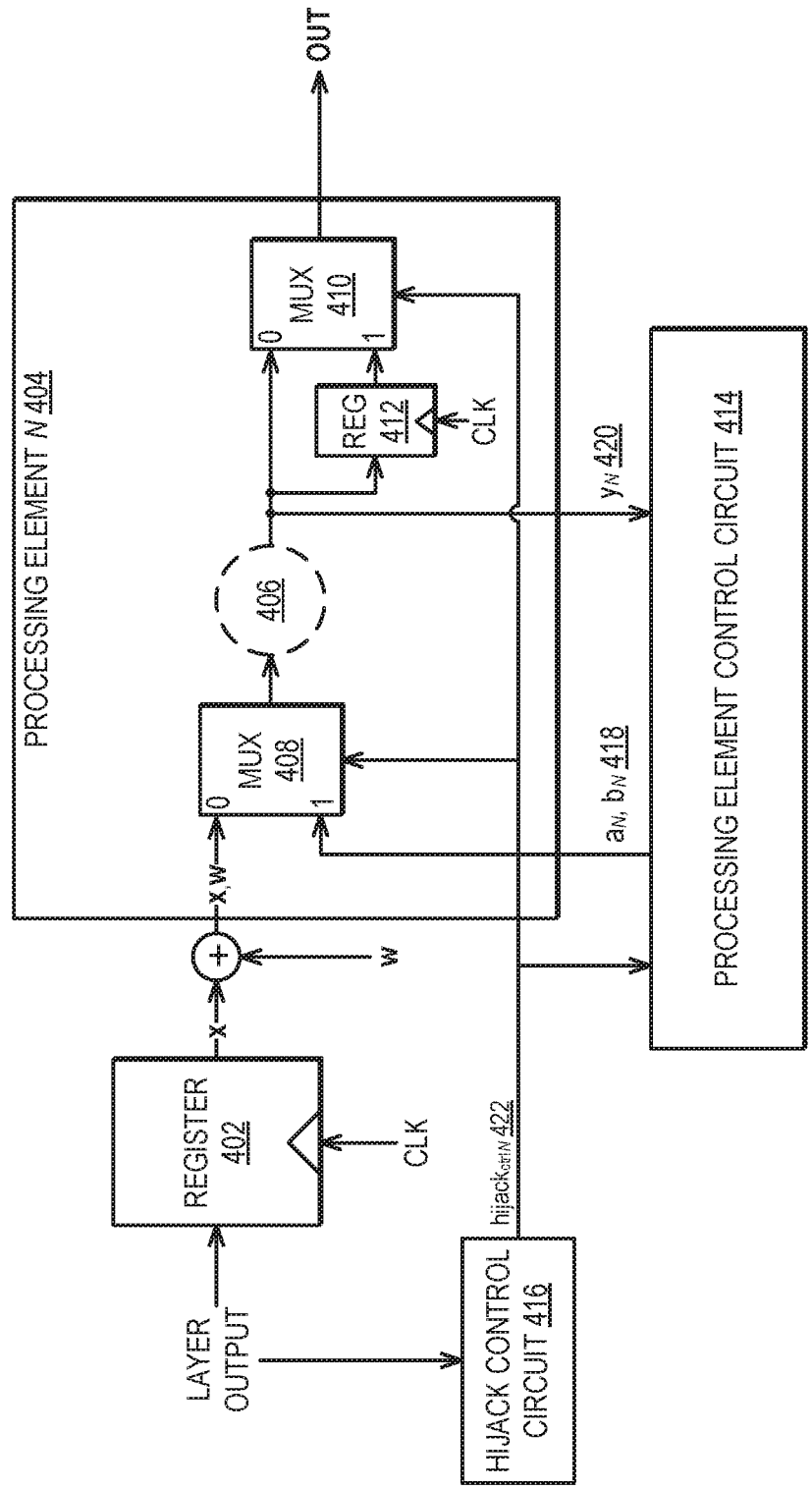
FIG. 4 is a block diagram of a neural network processing element according to one embodiment of the disclosure.

FIG. 4 is a block diagram of a neural network processing element according to one embodiment of the disclosure.

As in FIG. 3, the output (input vector x) of a neural network layer is received at a register (402) operating according to a system clock. The input vector (x) and weight vector (w) are combined and transmitted to the processing element (404).

In contrast to FIG. 3, the illustrated processing element (404) includes two multiplexers (408, 410) and a register (412). Additionally, the processing element (404) receives signals from a hijack control circuit (416) and a processing element control circuit (414). The processing element (404) is additionally configured to transmit data to the processing element control circuit (414). As illustrated, processing element (404) may comprise an nth processing element of many elements implemented in an AI processor. Herein, n-subscripts are omitted unless needed to distinguish among signals.

A first multiplexer (408) receives two inputs. The first input comprises the x and w vectors. The second input comprises an external data signal comprising two vectors a and b (418). In one embodiment, vectors a and b (418) are the same length as the x and w vectors. As will be described, vectors a and b (418) can comprise arbitrary data and are not necessarily limited to vectors used in neural network processing. In general, the vectors a and b (418) comprise any two vectors where the element-wise multiplication is desired. The first multiplexer (408) is controlled by the $hijack_{ctrl}$ signal (422) generated by the hijack control circuit (416). This circuit (416) is depicted (and described) in the description of FIG. 5 and that disclosure is not repeated herein. In general, the first multiplexer (408) operates to switch between neural network vectors x and w and remote vectors a and b (418).

The output of the first multiplexer (408) is transmitted to the processing device (406), which in the illustrated embodiment comprises a multiplier. In one embodiment, the processing device (406) performs an element-wise multiplication (Hadamard product) of the received vectors. Thus, the multiplier multiplies either the x and w vectors or the a and b vectors (418) depending on the value of the $hijack_{ctrl}$ signal (422).

In the illustrated embodiment, the processing device (406) outputs the element-wise multiplication result to a second multiplexer (410) and a register (412). When $hijack_{ctrl}$(422) is disabled, the second multiplexer (410) is configured to output the element-wise product of x and w. Further, the register (412) is configured to store the element-wise product of x and w for at least one clock cycle. Thus, when $hijack_{ctrl}$ (422) is disabled, the processing element (404) proceeds to process neural network layer vectors normally.

When $hijack_{ctrl}$(422) is enabled, the second multiplexer (410) utilizes the output of the register (412) as the output value of the processing element (404). Since the register latches the previously calculated output value (the element-wise product of x and w), the processing element simulates a repeated calculation of this product while computing the element-wise product of a and b (418), as described previously.

As illustrated, the output of the processing device (406) is also wired to the processing element control circuit (414), providing the output value y (420) to the processing element control circuit (414) on each clock cycle. As will be described in the description of FIG. 6, the processing element control circuit (414) includes logic to selectively ignore output values computed using the x and w vectors while capturing the products of the a and b vectors (418). Specifically, the hijack$_{ctrl}$ (422) is used to selectively capture the products of the a and b vectors (418). Although the description generally presumes that all operations take one clock cycle, the circuitry is not limited to such embodiments. Indeed, clock dividers may be utilized to latch values longer than one clock cycle based on the cycle rate of the processing device (406) or other components.

Further, although the preceding description describes the use of a processing device (406), other processing devices (e.g., adders) may be used in a similar fashion. In some embodiments, the processing device (406) may additionally only require one input. In these embodiments, the processing device (406) would comprise a unary processing element and the inputs to multiplexer (408) comprise a single vector. For example, in these embodiments, the processing device (406) can comprise a shifter or similar unary device.

In the illustrated circuit, a processing element (404) multiplies input vectors from a neural network layer while simultaneously latching the value. When the processing element (404) is switched to processing alternative values, a register latching the previous neural network output is used to drive the output while the output of the multiplier is routed to a processing element control circuit (414). Thus, the processing element (404) can be reused to perform multiplication operations on arbitrary input while the processing element (404) would normally be idle.

Figure 5:
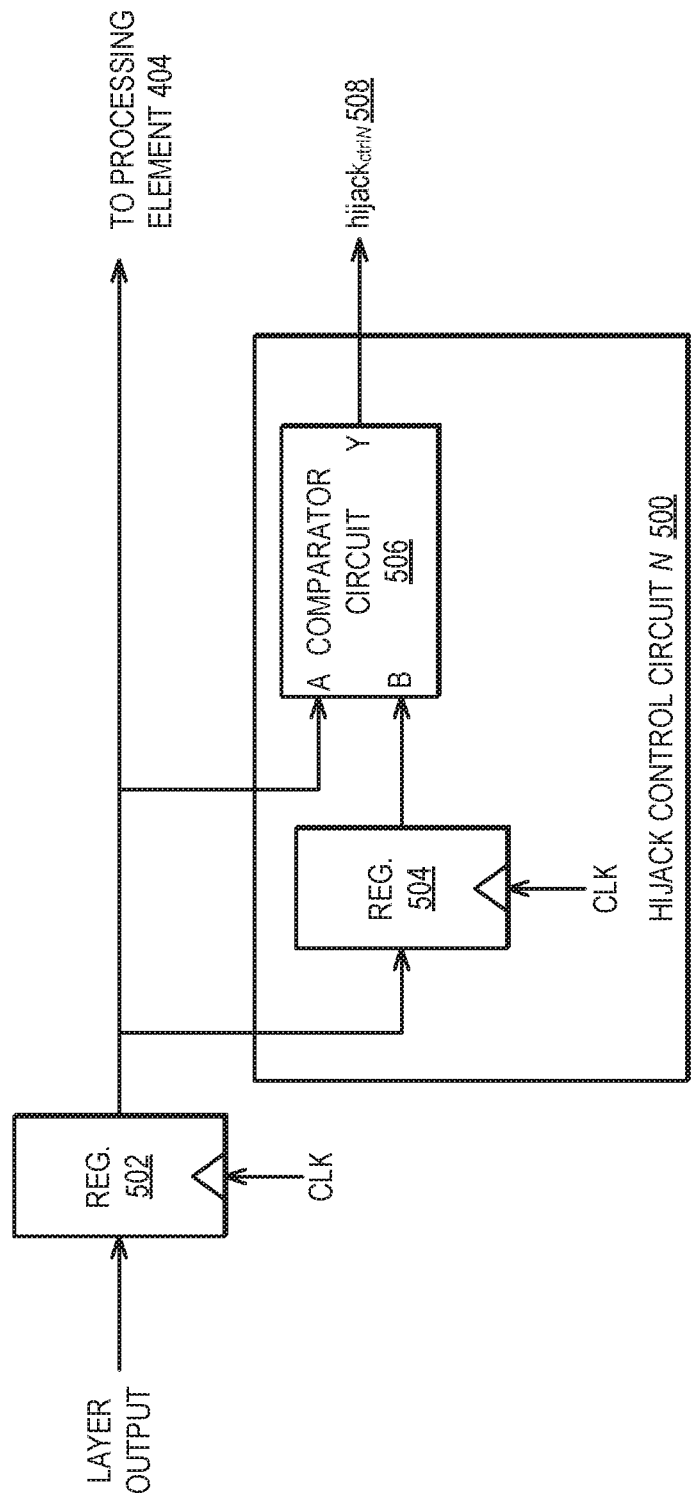
FIG. 5 is a block diagram of a hijack control circuit according to one embodiment of the disclosure.

FIG. 5 is a block diagram of a hijack control circuit according to one embodiment of the disclosure.

In the illustrated embodiment, register (502) performs the same function as register (402) in FIG. 4 and that description is not repeated herein.

As illustrated, the output of the register (502) is transmitted to the processing element (404) described in FIG. 4. Additionally, the register (502) output (which comprises a neural network layer output) is also transmitted simultaneously to a second register (504) and a first input of a comparator circuit (506). The comparator circuit (506) has a second input that is connected to the output of the register (504). This register (504) and comparator circuit (506) comprise the hijack control circuit (500).

As illustrated, the comparator circuit (506) effectively compares a current layer output with a previous layer output. In the illustrated embodiment, the previous layer output is stored in register (504) for predetermined number of clock cycles. Thus, the comparator circuit (506) determines whether the layer output has changed over a given interval.

In the illustrated embodiment, the comparator circuit (506) is configured to raise hijack$_{ctrl}$ (508) when the inputs A and B are equal and maintain hijack$_{ctrl}$ (508) in a low state otherwise. Thus, when the comparator circuit (506) detects that the current and previous layer outputs are identical, the comparator circuit detects that the processing element (404) should be idle and raises the hijack$_{ctrl}$ (508) to switch the inputs to the processing device of the processing element (404) as described above.

As one example, frequently during multi-level neural networks, clusters of artificial neurons will not be activated by the activation function. As a result, during stages of the neural network processing, subsets of the artificial neurons are receiving static (zero) input. The hijack control circuit (500) detects this condition by using a register to buffer the layer output and detect an unchanging layer output. Upon detecting this idleness, the hijack control circuit raises a signal diverting the inputs to one or more processing devices to an external input.

Figure 6:
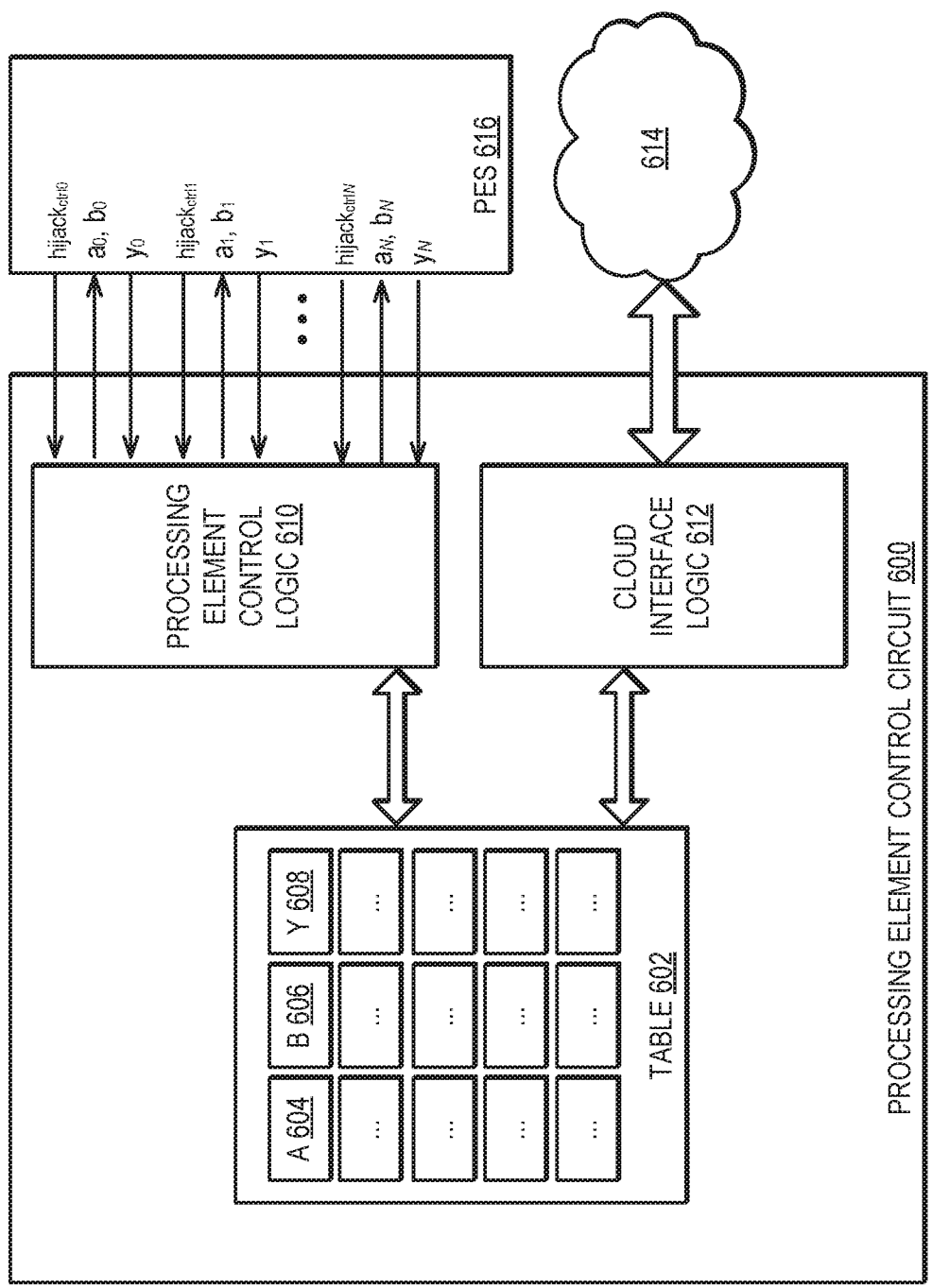
FIG. 6 is a block diagram illustrating a processing element control circuit according to some embodiments of the disclosure.

FIG. 6 is a block diagram illustrating a processing element control circuit according to some embodiments of the disclosure.

In the illustrated embodiment, the processing element control circuit (PECC) (600) is communicatively coupled to processing elements (616). The connection between the PECC (600) and processing elements (616) is illustrated in more detail in FIG. 4, the description of which is not repeated herein.

As illustrated, the interconnect between the PECC (600) and processing elements (616) includes a plurality of three buses. Each bus includes a hijack control signal (hijack$_{ctrl}$), an input vector data bus ($a_i$, $b_i$), and output data bus ($y_i$). As discussed above, the hijack control signal is generated per-processing element and comprises a control signal that is used by the processing element control logic (610) to identify which of the processing elements (616) is idle and available for processing.

The processing element control logic (610) is configured to monitor the various busses to detect when the hijack control signal is active, indicating that one or more processing elements (616) are available for processing. In response to detecting an available element, the processing element control logic (610) retrieves two input vectors (604, 606) from a table (602) of stored input vectors. The processing element control logic (610) then transmits the input vectors (604, 606) over a bus to a processing element. In some embodiments, this bus comprises the input vector data bus associated with the hijack control signal that was raised active. In other embodiments, the processing element control logic (610) manages an internal table of available processing elements and simply selects a different processing element input vector data bus.

After transmitting the input vectors, the processing element control logic (610) records which processing element received the input vectors and awaits the result over the output data bus. Once detecting a change in value of the output data bus, the processing element control logic (610) records the returned data into the table (602) as a corresponding output result (608).

In addition to the processing element control logic (610), the PECC (600) includes cloud interface logic (612). The cloud interface logic (612) serves as a network interface between the PECC (600) and one or more remote data sources (614). These remote data sources (614) may comprise cloud computing services or may comprise any other remote computing system. In some embodiments, the cloud interface logic (612) provides an external application programming interface (API) that allows remote data sources (614) to upload input vectors to table (602). In other embodiments, cloud interface logic (612) actively fetches input data vectors from the remote data sources (614) to insert into table (602). As described, no limit is placed on the type of data represented by the input data vectors stored in the table (602).

In the illustrated embodiment, the cloud interface logic (612) monitors and manages the table (602). In some embodiments, the cloud interface logic (612) determines when a given row includes both input values (604, 606) and an output value (608). When all three values are present, the cloud interface logic (612) can identify the computation as complete and upload the output value to the remote data sources (614). In some embodiments, the cloud interface logic (612) stores its own internal table mapping values (604, 606, 608) to a specific endpoint in the remote data sources, thus enabling the cloud interface logic (612) to return the data to the remote data source that provided the input values.

In the illustrated embodiment, some or all the elements may be implemented as circuitry. However, in other embodiments, various components may be implemented as a combination of hardware and/or firmware. For example, the cloud interface logic (612) may comprise a processor coupled to an embedded firmware providing the functionality to manage the table (602).

FIG. 7 is a flow diagram illustrating a method for re-using a processing element in an AI processor according to some embodiments of the disclosure.

In block 702, the method (700) operates a processing element normally. In one embodiment, the processing element comprises the processing element described in the description of FIG. 4, the disclosure of which is not repeated herein. In one embodiment, operating a processing element normally comprises multiplying values or vectors outputted by an artificial neuron in a layer of a neural network.

In block 704, the method (700) determines if the processing element is powered. Block 704 is illustrated primarily to terminate the method (700) and is not intended to be limiting.

In block 706, while the processing element is powered, the method (700) determines if the processing element is active or idle. As described above, this block (706) is performed by a dedicated hijack control circuit that is communicatively coupled to a given processing element. This circuit is described in the description of FIG. 5, the disclosure of which is not repeated herein. In general, the method (700) determines if the input values to the processing element are changing across at least one clock cycle. If so, the method (700) determines that the processing element is active and continues to process the normal input in block 702. However, if the input values are not changing, the method (700) determines that the processing element is idle and proceeds to block 708.

In block 708, the method (700) re-uses the processing element with an alternative set of input vectors.

In the illustrated embodiment, the alternative set of input vectors comprises a set of input vectors retrieved from a remote data source. In one embodiment, block 708 is performed by a dedicated processing element control circuit as described more fully in the description of FIG. 6, the disclosure of which is not repeated herein. Briefly, in block 708, the method (700) detects that the processing element is idle, retrieves a set of input vectors and routes the alternative input vectors to the input of the processing element. The resulting computation is then stored, as described more fully in FIG. 9.

FIG. 8 is a flow diagram illustrating a method for detecting that processing element is idle according to some embodiments of the disclosure.

In block 802, the method (800) stores a previous layer output value (A). As described above, the method (800) may store this value A in a register that is connected to the output value bit line. In one embodiment, the value A comprises the output of a layer of a neural network. That is, the output value A may comprise a vector generated by one or more artificial neurons.

In block 804, the method (800) receives a current layer output value (B). In one embodiment, the value B comprises the value of a neural network layer computed for the current clock cycle. In some embodiments, the output of the neural network layer is directly connected to a comparator (which performed block 806) and the output received in block 804 is received by this comparator.

In block 806, the method (800) compares the values of A and B. If the values are not equal, the method (800) determines that the processing element associated with the layer outputs is active. If the method (800) determines that the values are equal, the method (800) determines that the processing element associated with the layer outputs is idle.

In block 808, if the method (800) determines that the values of A and B are not equal, the method (800) outputs an active signal. In some embodiments, this comprises driving a hijack control signal low (logical zero).

In block 810, if the method (800) determines that the values of A and B are equal, the method (800) outputs an idle signal. In some embodiments, this comprises driving a hijack control signal high (logical one).

FIG. 9 is a flow diagram illustrating a method for managing a table of input vectors according to some embodiments of the disclosure.

In block 902, the method (900) determines if a table of input vectors is empty, if so, the method (900) ends. Alternatively, the method (900) may continuously execute block 912 (described later). As described above, the table may comprise a table of input vectors (A, B) and output results (Y) generated by one or more processing elements.

In block 904, the method (900) determines if any processing elements (PEs) are idle and thus available. As described above, this block may be performed by detecting whether a hijack control signal for a given processing element was raised (as described in FIG. 8 and elsewhere).

In block 906, the method (900) selects a next available PE. In one embodiment, multiple PEs may be available and idle. In this embodiment, the method (900) can select a random PE. In other embodiment, the method (900) may utilize a least-recently used (LRU) or similar algorithm for selecting a PE. In some embodiment, the method (900) selects a PE based on the hijack control signal (i.e., by utilizing the PE associated with the hijack control signal received).

In block 908, the method (900) selects one or more inputs from the table. In one embodiment, the method (900) can randomly select inputs from the table. In other embodiments, the table can comprise a stack or queue and the select inputs from the top or bottom of the structure, respectively. In some embodiments, each input is associated with a time-to-live (TTL), expiration date, or other timing value and the method (900) selects the oldest (or closest to expire) inputs. In some embodiments, the inputs can be associated with a priority level and the method (900) selects the inputs based on the priority level. In some embodiments, this results in the method (900) selecting the highest priority inputs. In some embodiments, the method (900) uses a combination of the foregoing approaches.

In block 910, the method (900) transmits the inputs to a processing element selected in block 906. In one embodiment, this block 910 comprises transmitting the input values to the input of the processing element and awaiting the computation result of the processing element.

In block 912, the method (900) records the output values in the table. In one embodiment, the method (900) records the output of the PE in the table along with the corresponding input values.

In block 914, the method (900) manages the table. In some embodiments, this block is performed after every write. In other embodiments, it may be performed before every read. Alternatively, or in conjunction with the foregoing, the block may be performed periodically. Alternatively, or in conjunction with the foregoing, the block may be performed when the table is full or approaching full.

In some embodiments, a separate cloud interface logic device (discussed in FIG. 6) performs block 914. In general, the method (900) can retrieve input vectors from a remote data source and insert these input vectors into the table. Additionally, the method (900) monitors the output values recorded in the table to detect when new output values are input into the table. Upon detecting these output values, the method (900) transmits the input vectors and associated output vectors to the remote data source. The method (900) may then remove the completed input vectors and output value from the table, clearing space for more input vectors.

The subject matter disclosed above may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein, depending at least in part upon context, may be used to describe any feature, structure, or characteristic in a singular sense or may be used to describe combinations of features, structures, or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure is described with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general-purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

These computer program instructions can be provided to a processor of: a general purpose computer to alter its function to a special purpose; a special purpose computer; ASIC; or other programmable digital data processing apparatus, such that the instructions, which execute via the processor of the computer or other programmable data processing apparatus, implement the functions/acts specified in the block diagrams or operational block or blocks, thereby transforming their functionality in accordance with embodiments herein.

For the purposes of this disclosure a computer readable medium (or computer-readable storage medium/media) stores computer data, which data can include computer program code (or computer-executable instructions) that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable, and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid-state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium for execution by a processor. Modules may be integral to one or more servers, or be loaded and executed by one or more servers. One or more modules may be grouped into an engine or an application.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than, or more than, all the features described herein are possible.

Functionality may also be, in whole or in part, distributed among multiple components, in manners now known or to become known. Thus, myriad software/hardware/firmware combinations are possible in achieving the functions, features, interfaces, and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

What is claimed is:

1. A device comprising:
 a processing element, the processing element including a processing device configured to:
  receive a first set of vectors; and
  receive a second set of vectors after the first set of vectors is received;
 a processing element control circuit; and
 a hijack control circuit comprising a comparator circuit and a register, wherein:
  the comparator circuit comprises a first comparator input, a second comparator input, and an output;
  the register comprises a register input and a register output;
  the first comparator input is connected to an input of the processing element such that the second set of vectors are received at the processing element and the first comparator input;
  the register output is connected directly to the second comparator input and
  the hijack control circuit is configured to:
   receive, at the register input of the register at a first time, the first set of vectors;
   receive, at the second comparator input from the register output at a second time after the first time, the first set of vectors, wherein the first set of vectors is stored at the register based on the first set of vectors being received at the register;
   receive, at the first comparator input at the second time, the second set of vectors;
   compare, by the comparator circuit of the hijack control circuit, the second set of vectors received at the first comparator input with the first set of vectors received at the second comparator input
   determine, based on the comparison of the second set of vectors with the first set of vectors by the comparator circuit, that the first set of vectors and the second set of vectors are the same, wherein the determination that the first set of vectors and the second set of vectors are the same is indicative of the processing element being idle and that a previous output of the processing device corresponding to the first set of vectors is the same as a current output of the processing device corresponding to the second set of vectors; and
   output, by the comparator circuit based on the comparison indicating that the processing element is idle, a signal configured to cause the second set of vectors at the processing element to be replaced with a third set of vectors;
 wherein the processing element control circuit is further configured to store a set of values representing the third set of vectors, the set of values retrieved from a remote data source.

2. The device of claim 1, the processing device comprising a multiplier, the multiplier configured to multiply a set of vectors.

3. The device of claim 1, wherein the register is a first register and the processing element further comprising:
 a first multiplexer having an output coupled to an input of the processing device, the first multiplexer including: a first input for receiving the first set of vectors, a second input for receiving the third set of vectors, and a control input connected to the hijack control circuit;
 a second register connected to an output of the processing device; and
 a second multiplexer, the second multiplexer including: a first input for receiving an output of the first multiplexer, a second input for receiving an output of the second register, and a control input connected to the hijack control circuit.

4. The device of claim 1, an output of the processing device connected to an input of the processing element control circuit.

5. The device of claim 1, the hijack control circuit further comprising the register, wherein:
 the register receives the first set of vectors; and
 an output of the comparator circuit comprising the signal causing the processing element to replace the first set of vectors with the third set of vectors.

6. The device of claim 1, the first set of vectors comprising a set of outputs from a layer of a neural network.

7. The device of claim 1, the processing element control circuit configured to receive the signal from the hijack control circuit indicating that the processing element is idle and provide the third set of vectors in response to receiving the signal.

8. The device of claim 7, the processing element control circuit further configured to select the third set of vectors from a table of vectors stored by the processing element control circuit.

9. The device of claim 8, the processing element control circuit further configured to insert an output value associated with the third set of vectors into the table and upload the output value to the remote data source.

10. A method comprising:
 receiving, at a processing element comprising a processing device, a first set of vectors;
 receiving, at the processing device, a second set of vectors after the first set of vectors is received;
 receiving, at a register input of a hijack control circuit at a first time, the first set of vectors, wherein:
  the hijack control circuit comprises a comparator circuit and a register;
  the comparator circuit comprises a first comparator input, a second comparator input, and an output;

the register comprises the register input and a register output;
the first comparator input is connected to an input of the processing element such that the second set of vectors are received at the processing element and the first comparator input;
the register output is connected directly to the second comparator input;
receiving, at the second comparator input from the register output at a second time after the first time, the first set of vectors, wherein the first set of vectors is stored at the register based on the first set of vectors being received at the register;
receiving, at the first comparator input at the second time, the second set of vectors;
comparing, by the comparator circuit of the hijack control circuit, the second set of vectors received at the first comparator input with the first set of vectors received at the second comparator input;
determining, based on the comparison of the second set of vectors with the first set of vectors by the comparator circuit, that the first set of vectors and the second set of vectors are the same, wherein the determination that the first set of vectors and the second set of vectors are the same is indicative of the processing element being idle and that a previous output of the processing device corresponding to the first set of vectors is the same as a current output of the processing device corresponding to the second set of vectors; and
outputting, by the comparator circuit based on the comparison indicating that the processing element is idle, a signal configured to cause the second set of vectors at the processing element to be replaced with a third set of vectors; and
storing, by a processing element control circuit, a set of values representing a third set of vectors, the set of values retrieved from a remote data source.

11. The method of claim 10, the processing device comprising a multiplier configured to multiply a set of vectors.

12. The method of claim 10, wherein the register is a first register and further comprising:
switching, by a multiplexer of the processing element, between the first set of vectors and the third set of vectors based on a hijack control signal generated by the hijack control circuit;
storing, by the processing element, an output of the processing device in a second register; and
transmitting, by the processing element, the output of the processing device to a second multiplexer, the second multiplexer configured to toggle between an output of the second register and the output of the processing device based on the hijack control circuit.

13. The method of claim 10, further comprising transmitting an output of the processing device connected to the processing element control circuit.

14. The method of claim 10, further comprising:
storing, at the hijack control circuit, a previous set of vectors in the register; and
comparing, by the hijack control circuit, the first set of vectors with the previous set of vectors using the comparator circuit, an output of the comparator circuit comprising a signal causing the processing element to replace the first set of vectors with the third set of vectors.

15. The method of claim 10, the first set of vectors comprising a set of outputs from a layer of a neural network.

16. The method of claim 10, further comprising: receiving, by the processing element control circuit, a signal from the hijack control circuit indicating that the processing element is idle and providing, by the processing element control circuit, the third set of vectors in response to receiving the signal.

17. The method of claim 16, further comprising selecting, by the processing element control circuit, the third set of vectors from a table of vectors stored by the processing element control circuit.

18. The method of claim 17, further comprising: inserting, by the processing element control circuit, an output value associated with the third set of vectors into the table and uploading the output value to the remote data source.

19. An apparatus comprising:
a processing element configured to:
    receive a first set of vectors; and
    receive a second set of vectors after the first set of vectors is received;
a processing element control circuit; and
a hijack control circuit comprising a comparator circuit and a register, wherein:
    the comparator circuit comprises a first comparator input, a second comparator input, and an output;
    the register comprises a register input and a register output;
    the first comparator input is connected to an input of the processing element such that the second set of vectors are received at the processing element and the first comparator input;
    the register output is connected directly to the second comparator input; and
    the hijack control circuit is configured to:
        receive, at the register input of the register at a first time, the first set of vectors;
        receive, at the second comparator input from the register output at a second time after the first time, the first set of vectors, wherein the first set of vectors is stored at the register based on the first set of vectors being received at the register;
        receive, at the first comparator input at the second time, the second set of vectors;
        compare, by the comparator circuit of the hijack control circuit, the second set of vectors received at the first comparator input with the first set of vectors received at the second comparator input;
        determine, based on the comparison of the second set of vectors with the first set of vectors by the comparator circuit, that the first set of vectors and the second set of vectors are the same, wherein the determination that the first set of vectors and the second set of vectors are the same is indicative of the processing element being idle and that a previous output of the processing element corresponding to the first set of vectors is the same as a current output of the processing element corresponding to the second set of vectors; and
        output, by the comparator circuit based on the comparison indicating that the processing element is idle, a signal configured to cause the second set of vectors at the processing element to be replaced with a third set of vectors,
wherein the processing element control circuit is further configured to store a set of values representing the third set of vectors, the set of values retrieved from a remote data source.

* * * * *